(12) United States Patent
Li

(10) Patent No.: US 11,835,028 B1
(45) Date of Patent: Dec. 5, 2023

(54) SAIL-DRIVEN POWER GENERATION SYSTEM

(71) Applicant: Wei Li, Crosby, TX (US)

(72) Inventor: Wei Li, Crosby, TX (US)

( * ) Notice: Subject to any disclaimer, the term of this patent is extended or adjusted under 35 U.S.C. 154(b) by 0 days.

(21) Appl. No.: 18/240,716

(22) Filed: Aug. 31, 2023

Related U.S. Application Data

(60) Provisional application No. 63/442,704, filed on Feb. 1, 2023.

(51) Int. Cl.
| | |
|---|---|
| *F03D 13/20* | (2016.01) |
| *F03D 9/25* | (2016.01) |
| *F03D 3/02* | (2006.01) |
| *H02K 7/116* | (2006.01) |
| *H02K 7/18* | (2006.01) |
| *F03D 15/00* | (2016.01) |

(52) U.S. Cl.
CPC ............ *F03D 13/2005* (2023.08); *F03D 3/02* (2013.01); *F03D 9/25* (2016.05); *F03D 15/207* (2023.08); *H02K 7/116* (2013.01); *H02K 7/183* (2013.01); *F05B 2270/1033* (2013.01); *F05B 2270/20* (2013.01)

(58) Field of Classification Search
CPC .......... F03D 13/2005; F03D 3/02; F03D 9/25; F03D 15/207; H02K 7/116; H02K 7/183; F05B 2270/1033; F05B 2270/20
See application file for complete search history.

(56) References Cited

U.S. PATENT DOCUMENTS 9,011,096 B2 * 4/2015 Su ............................ F03D 3/067
416/111

* cited by examiner

*Primary Examiner* — Joseph Ortega
(74) *Attorney, Agent, or Firm* — QUICKPATENTS, LLC; Kevin Prince

(57) ABSTRACT

A wind turbine comprises a mast that has a first end connected with a generator, and an opposing second end. A first vane frame includes a top member, a bottom member, and two opposing side members. A plurality of vanes are fixed between each side member of the vane frame, each vane configured for rotating between a closed position and an open position. The first vane frame is fixed along the mast with a similar second vane frame fixed on an opposing side of the mast. Actuator mechanisms are configured for rotating the vanes between the open and closed positions. Additional vane frames defined as first and second jibs are configured to extend outwardly from the vane frames. A controller actuates the vanes to maximize torque imparted to the mast by the wind. In a wind turbine system, three of the turbines are fixed on a rotatable platform.

15 Claims, 8 Drawing Sheets

SAIL-DRIVEN POWER GENERATION SYSTEM

CROSS-REFERENCE TO RELATED APPLICATIONS

This application claims the benefit of U.S. Provisional Patent Application 63/442,704, filed on Feb. 1, 2023, and is incorporated herein by reference.

STATEMENT REGARDING FEDERALLY SPONSORED RESEARCH AND DEVELOPMENT

Not Applicable.

FIELD OF THE INVENTION

This invention relates to electrical wind turbine generators, and more particularly to an improved wind turbine and system therefore.

BACKGROUND

Wind turbines of the prior art are difficult to regulate for consistent power output, as wind forces and directions can change frequently. Further, wind farms of the prior art are relatively expensive to operate and require a large area of land.

Therefore, there is a need for a device that can regulate the energy produced by a wind turbine. Such a needed invention would provide for adjustable wind vanes and additional wind vane jibs that can extend or retract to provide more or less energy. Such a needed device would allow for consistent electrical energy product in a changing wind environment, either on land or sea. The present invention accomplishes these objectives.

SUMMARY OF THE INVENTION

The present device is a wind turbine that comprises a mast that has a longitudinal axis, a first end connected with a generator, and an opposing second end. A frame is configured for rotatably holding the mast by the first end and the second end. In some embodiments the frame is part of a larger rotatable platform, while in simpler embodiments the frame is as basic as a rectangular frame.

A first vane frame includes a top member, a bottom member, and two opposing side members, all of which define a vane frame plane. A plurality of vanes are fixed between each side member of the vane frame, each vane being configured for rotating within the first vane frame between a zero-degree closed position wherein each vane is substantially aligned with the vane frame plane, and a 90-degree open position wherein each vane is orthogonal to the vane frame plane. The first vane frame is fixed along one of the side members thereof with the mast such that the top member of the vane frame is proximate the second end of the mast and such that the bottom member of the first vane frame is proximate the first end of the mast. One or more actuator mechanisms are configured for rotating the vanes between the open position and the closed position.

A second vane frame, similar to the first vane frame, is fixed opposite the mast such that when the vanes of the first vane frame are in the open position, each vane is oriented 180-degrees opposite of the open vanes of the second vane frame.

In use, with a wind blowing against the wind turbine along a wind vector, the actuator mechanisms of each vane frame cooperate to rotate the vanes in the first vane frame to the closed position to cause the wind to rotate the mast in a first direction, and to rotate the vanes in the second vane frame to the open position to allow the wind to blow through the second vane frame with minimal resistance. When the vane frame, become aligned with the wind vector the actuator mechanism toggles the rotation of the vanes to open the vanes in the first vane frame and close the vanes in the second vane frame, so that the wind continuously drives rotation of the mast in the first direction.

In some embodiments, the mast further includes a second set of the vane frames rotationally offset from a first set of the vane frames by about 45-degrees. A third set of the vane frames are preferably included, offset by about another 45-degrees from the second set of the vane frames. As such, wind coming from a particular wind vector is always striking one or more of the vane frames at a nearly orthogonal angle for smoother rotational driving of the wind turbine.

Preferably the wind turbine includes a first jib that is slidably engaged behind the first vane frame. The first jib includes a first jib vane frame, similar to the first vane frame, wherein the vanes of the first jib vane frame are oriented in common with the vanes of the first vane frame. A first jib actuator is configured for moving the first jib between a retracted position directly behind the first vane frame and an extended position laterally away from the mast and the first vane frame. The first jib vane frame may move along a track (not shown), or the like, supported by the bottom member and perhaps also the top member.

Similarly, a second jib that is slidably engaged in front of the second vane frame. The second jib includes a second jib vane frame, similar to the first vane frame, wherein the vanes of the second jib vane frame are oriented in common with the vanes of the second vane frame. A second jib actuator is configured for moving the second jib between the retracted position directly in front of the second vane frame and the extended position laterally away from the mast and the second vane frame. The second jib vane frame may move along a track, or the like, supported by the bottom member and perhaps also the top member.

Preferably the one or more actuator mechanisms of the first vane frame are connected with the one or more actuator mechanisms of the first jib vane frame for common movement of the vanes of the first vane frame and the vanes of the first jib vane frame. Similarly, the one or more actuator mechanisms of the second vane frame are connected with the one or more actuator mechanisms of the second jib vane frame for common movement of the vanes of the second vane frame and the vanes of the second jib vane frame. Likewise, the first jib actuator is connected with the second jib actuator for common movement of the first job and the second jib between the retracted positions and the extended positions thereof.

In preferred embodiments, the wind turbine further includes a controller configured for actuating the vane frame actuator mechanisms and the jib actuators, to maximize the torque imparted to the mast by the wind. The controller controls either the electrical power or the hydraulic power that is transmitted to the actuators. In some embodiments an anemometer is included and electrically connected with the controller to determine the wind vector. In other embodiments, one or more of the vanes in one or more of the vane frames include a flex sensor configured to detect wind strength against the vanes.

In a wind turbine system, the mast, first vane frame, first jib vane frame, second vane frame, and second jib vane frame together form a vane assembly. The frame in such embodiments takes the form of the round rotatable platform fixed at the turbine assemblies and further including two additional of the turbine assemblies each mutually spaced—degrees from a center point around the round rotatable platform. A center axle of the round rotatable platform may include a platform controller configured to rotate the platform to optimize power from the three generators of the three turbine assemblies.

Such embodiments preferably include a platform generator fixed with the center axle of the rotatable platform and configured to generate electricity when the rotatable platform rotates. A gearbox is disposed between the first end of the mast and the generator, and one of the gearboxes is disposed between the center axle and the platform generator.

In some embodiments, a buoy base is further included and configured for holding the rotatable platform and gearboxes above a body of water, such as an ocean or lake. The buoy base comprises a substantially hollow interior in fluid communication with the body of water through one or more pumps electrically connected with the controller. As such, the buoy base can position the rotatable platform and the gearboxes between a raised position and a lowered position based on wind conditions at various elevations above the body of water, as determined by the controller.

The present invention is a device that regulates the energy produced by a wind turbine to provide for consistent energy production in a changing wind environment, either on land or at sea. The present invention provides for adjustable wind vanes and additional wind vane jibs that can extend or retract to provide more or less energy. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
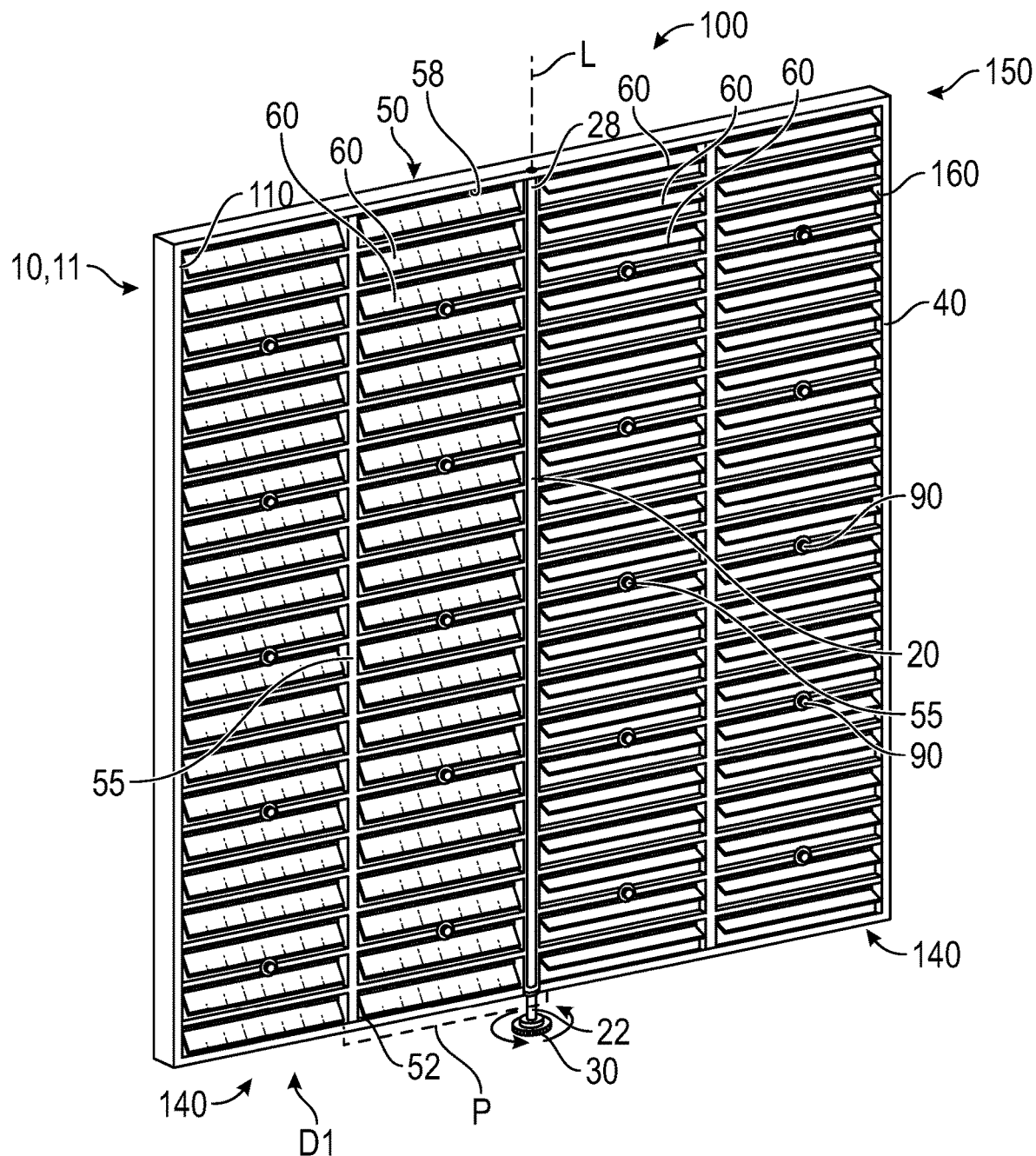
FIG. 1 is a perspective view of the invention, illustrated with two jibs slidably extended beyond two vane frames of the invention.
Figure 2:
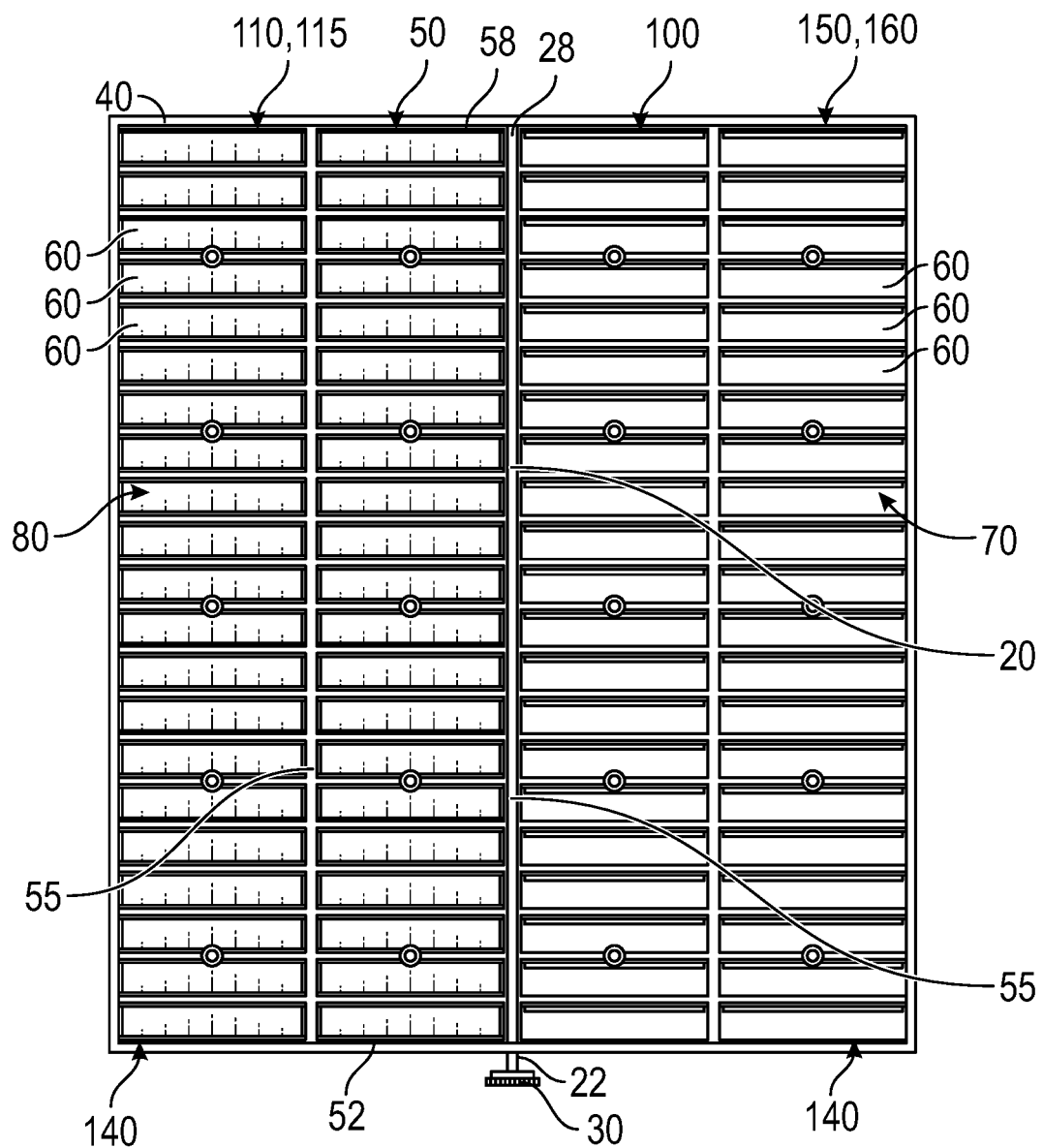
FIG. 2 is a front elevational view of the invention, illustrating a first vane frame having vanes in a closed position, a second vane frame having vanes in an open configuration, and first and second jibs in an extended configuration.
Figure 3:
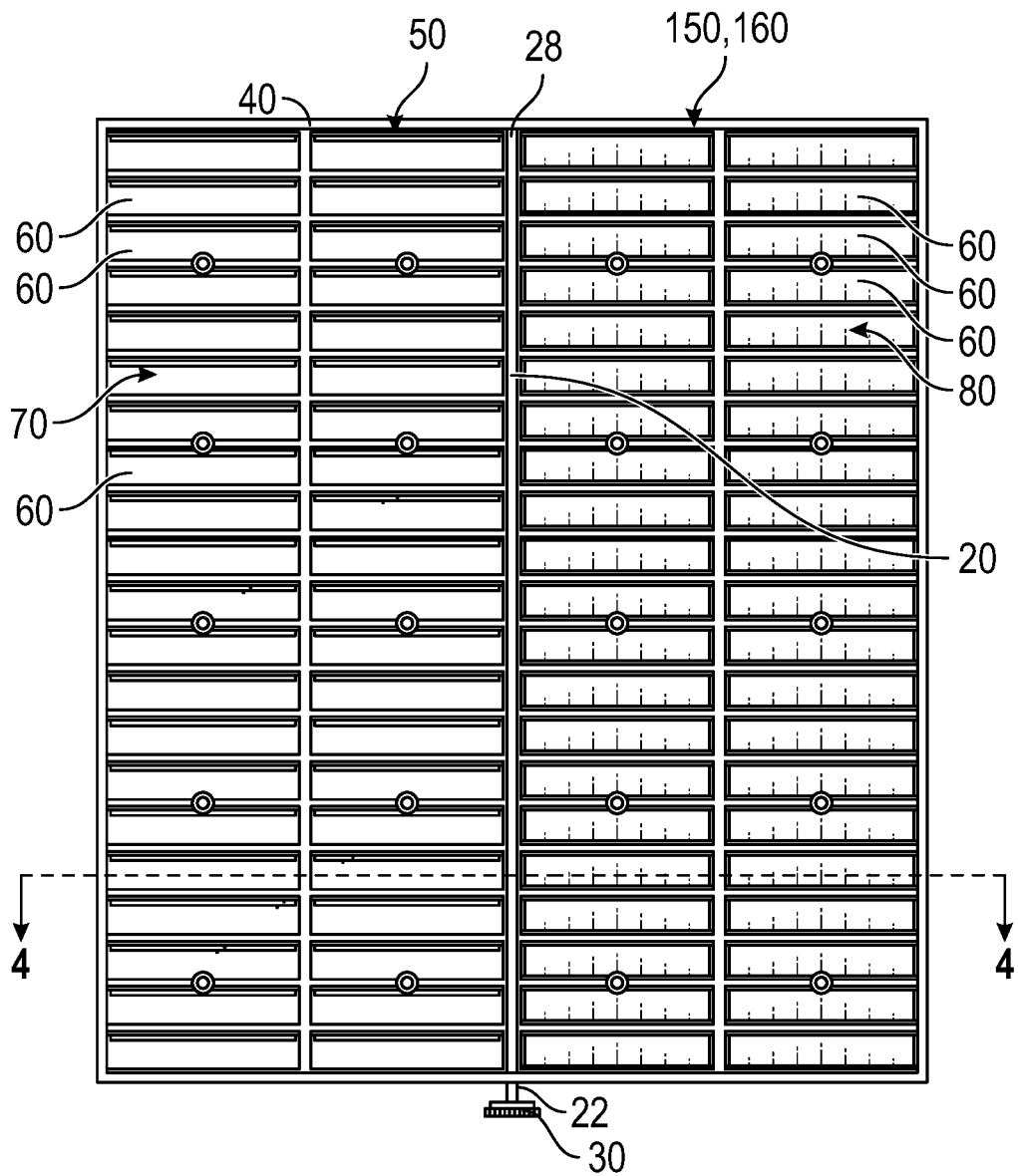
FIG. 3 is a front elevational view of the invention, showing the first vane frame having vanes in the open position, the second vane frame having the vanes in a closed configuration, and the first and second jibs in a retracted configuration.
Figure 4:
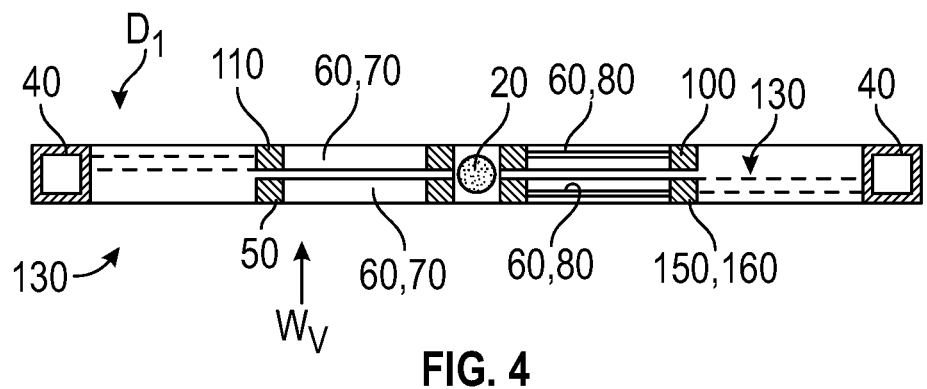
FIG. 4 is a cross-sectional view taken along line 4-4 of FIG. 3.
Figure 5:
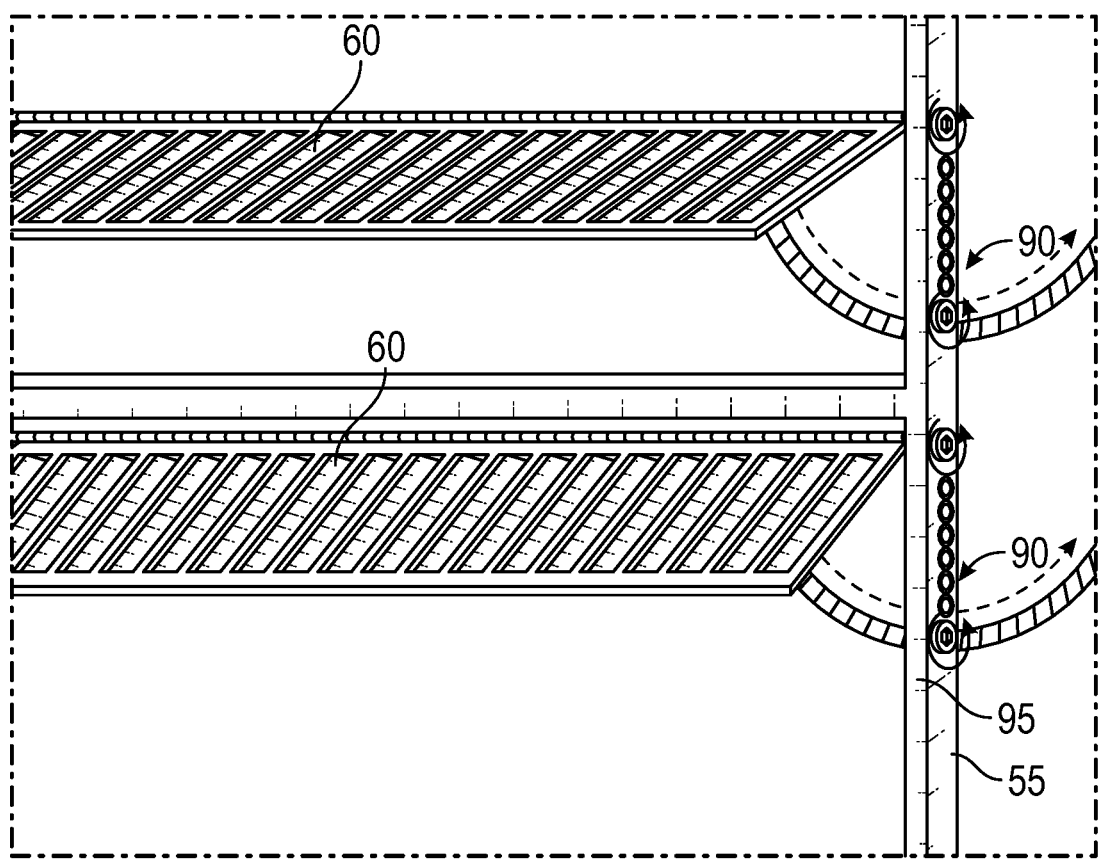
FIG. 5 is a partial perspective view of two of the vanes between the closed position and the open position, further illustrating an actuator mechanism for moving the vanes between the open position and the closed position.
Figure 6:
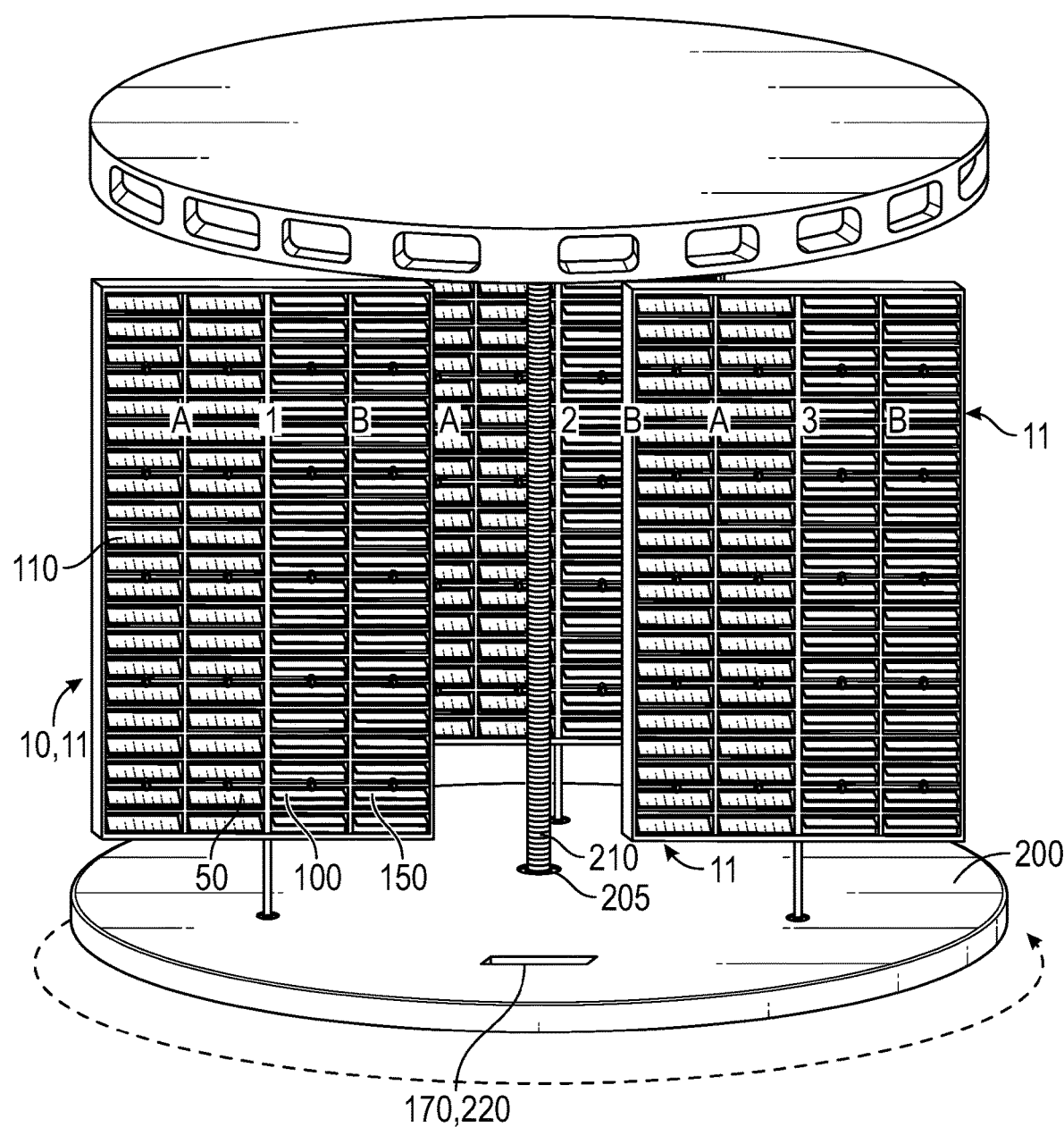
FIG. 6 is a perspective view of an embodiment of the invention having three wind turbine assemblies fixed on a rotatable platform.
Figure 7:
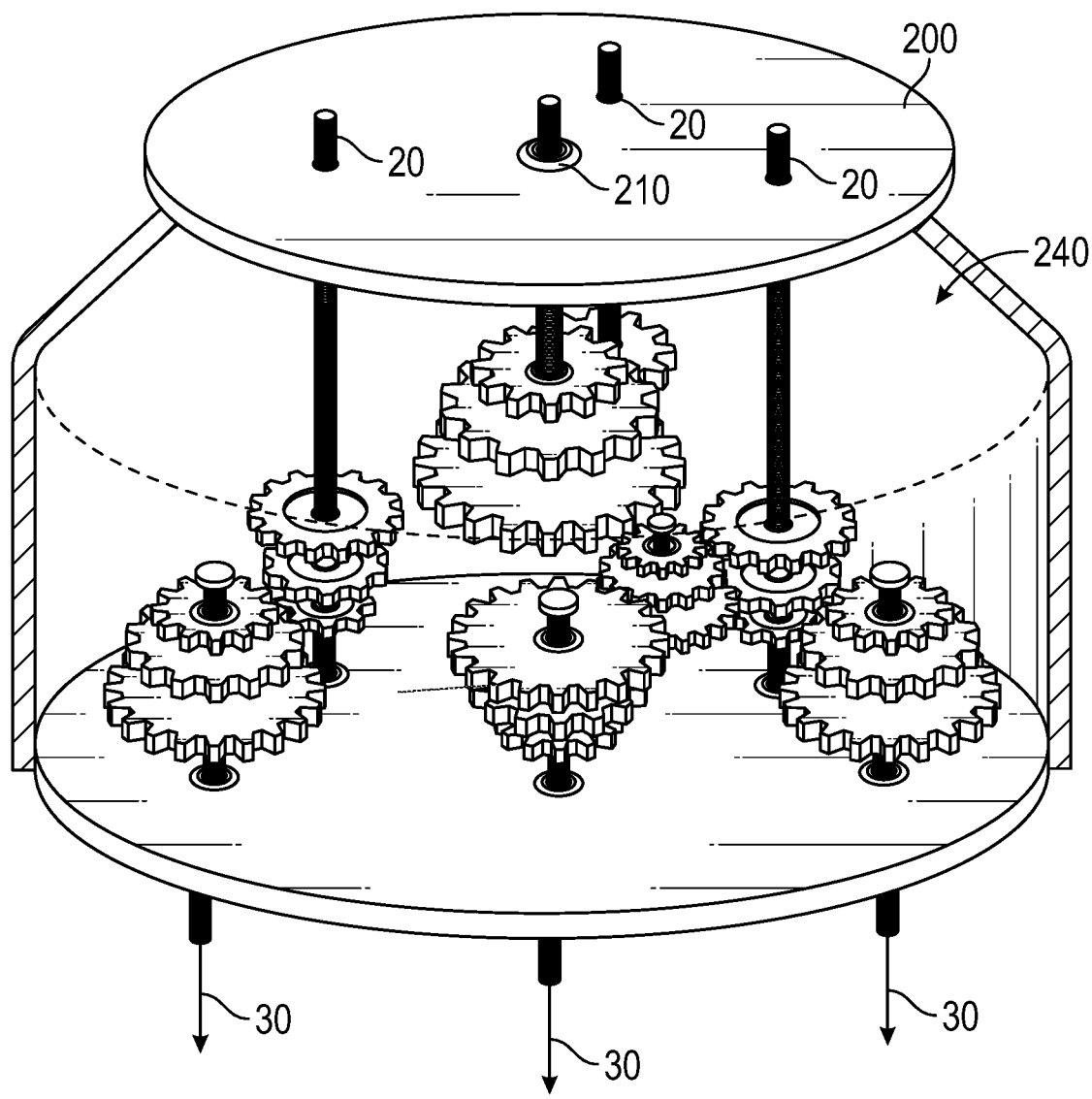
FIG. 7 is a perspective view of an embodiment of the invention having a gearbox arrangement on the three wind turbine assemblies as well as a platform gearbox on a central axle of the rotatable platform.

FIGS. 1-5 illustrate a wind turbine 10 that comprises a mast 20 that has a longitudinal axis L, a first end 22 connected with a generator 30, and an opposing second end 28. A frame 40 is configured for rotatably holding the mast 20 by the first end 28 and the second end 28. In some embodiments the frame 40 is part of a larger rotatable platform 200 (FIGS. 6 and 7), while in simpler embodiments the frame 40 is as basic as is shown in FIGS. 1-3. In some embodiments, the rotatable platform is mounted to a buoy (not shown) for sea-based installations.

A first vane frame 50 includes a top member 58, a bottom member 52, and two opposing side members 55, all of which define a vane frame plane P (FIG. 1). A plurality of vanes 60 are fixed between each side member 55 of the vane frame 50, each vane 60 being configured for rotating within the first vane frame 50 between a zero-degree closed position 80 wherein each vane 60 is substantially aligned with the vane frame plane P, and a 90-degree open position 70 wherein each vane 60 is orthogonal to the vane frame plane P. The first vane frame 50 is fixed along one of the side members 55 thereof with the mast 20 such that the top member 58 of the vane frame 50 is proximate the second end 28 of the mast 20 and such that the bottom member 52 of the first vane frame 50 is proximate the first end 22 of the mast 20.

One or more actuator mechanisms 90 (FIG. 5) are configured for rotating the vanes 60 between the open position 70 and the closed position 80. The actuator mechanisms 90 may include a rack 95 that works with a pinion gear 96 to actuate the vanes 60. A motor (not shown) drives the rack 95 slidably disposed within the side frame 55 to rotate each pinion gear 96 to rotate the vanes. The actuator mechanisms 90 may include other vane rotating mechanisms as are known in the art.

A second vane frame 100, similar to the first vane frame 50, is fixed opposite the mast 20 such that when the vanes 60 of the first vane frame 50 are in the open position 70, each vane 60 is oriented 180-degrees opposite of the open vanes 60 of the second vane frame 100.

In use, with a wind blowing against the wind turbine 10 along a wind vector $V_W$, the actuator mechanisms 90 of each vane frame 50 cooperate to rotate the vanes 60 in the first vane frame 50 to the closed position 80 to cause the wind to rotate the mast 20 in a first direction $D_1$, and to rotate the vanes 60 in the second vane frame 100 to the open position 70 to allow the wind to blow through the second vane frame 100 with minimal resistance. When the vane frame 50,100 become aligned with the wind vector $V_W$ the actuator mechanism 90 toggles the rotation of the vanes 60 to open the vanes 60 in the first vane frame 50 and close the vanes 60 in the second vane frame 100, so that the wind continuously drives rotation of the mast 20 in the first direction $D_1$.

Figure 9:
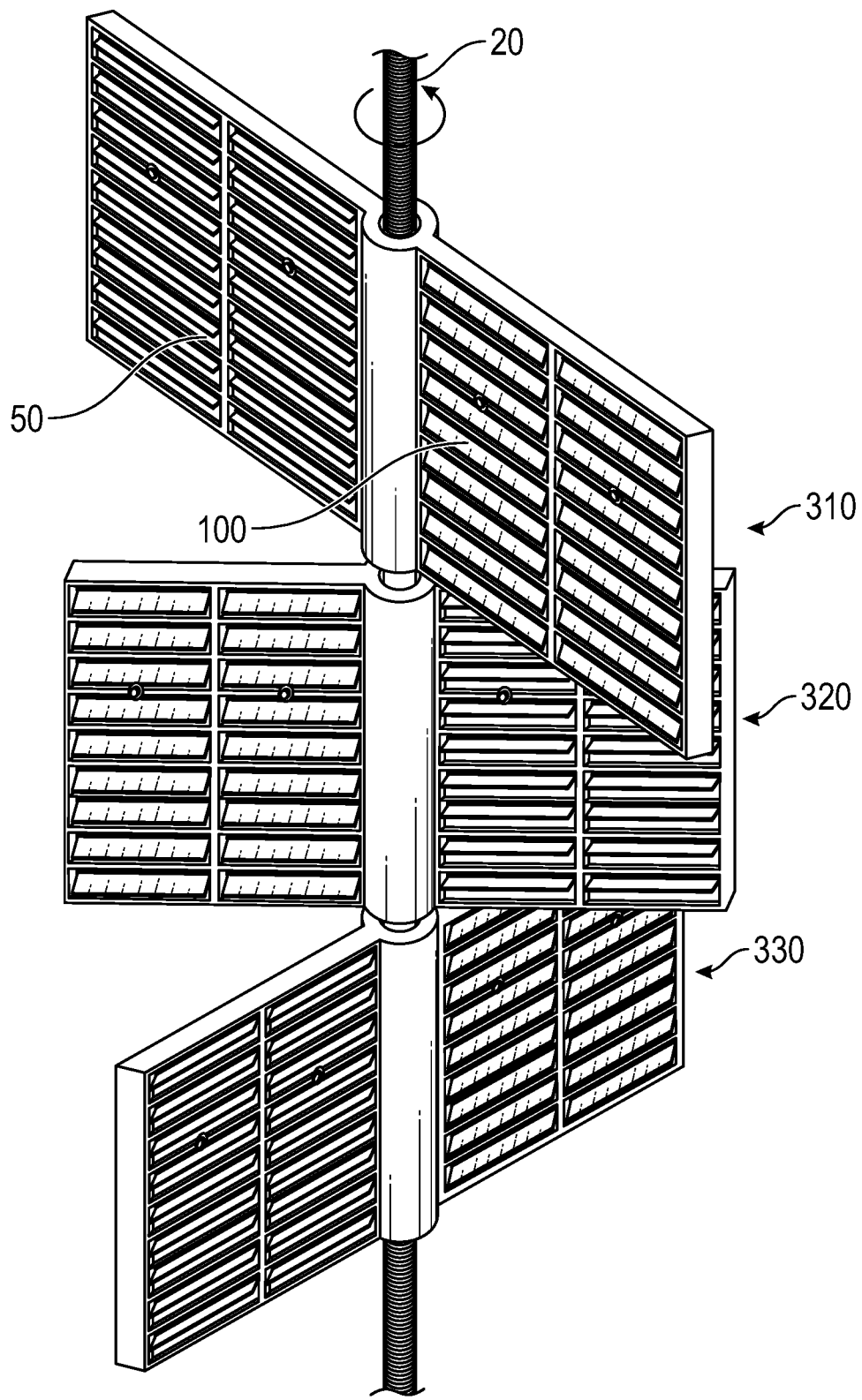
FIG. 9 is a perspective diagram of a mast having three sets of the vane frames, each rotated consecutively 45-degrees.

In some embodiments, the mast 20 further includes a second set 320 (FIG. 9) of the vane frames 50,100 rotationally offset from a first set 310 of the vane frames 50,100 by about 45-degrees. A third set 330 of the vane frames 50,100 are preferably included, offset about another 45-degrees from the second set 320 of the vane frames 50,100. As such, wind coming from a particular wind vector $W_v$ (FIG. 4) is always striking one or more of the vane frames 50,100 at a nearly orthogonal angle for smoother rotational driving of the wind turbine 10.

Preferably the wind turbine 50 includes a first jib 110 that is slidably engaged behind the first vane frame 50. The first jib 110 includes a first jib vane frame 115, similar to the first vane frame 50, wherein the vanes 60 of the first jib vane frame 115 are oriented in common with the vanes 60 of the first vane frame 50. A first jib actuator 120 is configured for moving the first jib 110 between a retracted position 130 directly behind the first vane frame 50 and an extended position 140 laterally away from the mast 20 and the first vane frame 50. The first jib vane frame 115 may move along a track (not shown), or the like, supported by the bottom member 52 and perhaps also the top member 58.

Similarly, a second jib 150 that is slidably engaged in front of the second vane frame 100. The second jib 150 includes a second jib vane frame 160, similar to the first vane frame 50, wherein the vanes 60 of the second jib vane frame 160 are oriented in common with the vanes 60 of the second vane frame 100. A second jib actuator 122 is configured for moving the second jib 150 between the retracted position 130 directly in front of the second vane frame 100 and the extended position 140 laterally away from the mast 20 and the second vane frame 100. The second jib vane frame 160 may move along a track (not shown), or the like, supported by the bottom member 52 and perhaps also the top member 58.

Preferably the one or more actuator mechanisms 90 of the first vane frame 50 are connected with the one or more actuator mechanisms 90 of the first jib vane frame 115 for common movement of the vanes 60 of the first vane frame 50 and the vanes 60 of the first jib vane frame 115. Similarly, the one or more actuator mechanisms 90 of the second vane frame 100 are connected with the one or more actuator mechanisms 90 of the second jib vane frame 160 for common movement of the vanes 60 of the second vane frame 100 and the vanes 60 of the second jib vane frame 160. Likewise, the first jib actuator 120 is connected with the second jib actuator 122 for common movement of the first job 110 and the second jib 150 between the retracted positions 130 and the extended positions 140 thereof. As such, a single motor (not shown), linear actuator (not shown), or the like can be used to actuate the actuator mechanisms 90,120,122.

In preferred embodiments, the wind turbine 10 further includes a controller 170 configured for actuating the vane frame actuator mechanisms 90 and the jib actuators 120, 122 to maximize the torque imparted to the mast 20 by the wind. The controller 170 controls either the electrical power or the hydraulic power that is transmitted to the actuators 90,120, 122. The controller 170 can vary the angle of the vanes 60 so that the torque imparted to the mast 20 by the wind is regulated. In high-wind conditions, all vanes 60 may be mostly open, for example, with a differential between the vanes 60 of the first vane frame 50 and the second vane frame 100 being just enough to impart a rotation to the frame 40 within a desired range of torque. In some embodiments an anemometer 180 (FIG. 6) is included and electrically connected with the controller 170 to determine the wind vector $V_W$. In other embodiments, one or more of the vanes 60 in one or more of the vane frames 50,100,115,160 include a flex sensor 190 configured to detect wind strength against the vanes 60. Such a flex sensor 190 may be applied to the vanes 60 to determine flex being imparted to the vane 60 by the wind. Such a flex sensor 190 may be a resistance-type strip (not shown) that changes resistance based on the bend experienced by the strip. Alternately, or additionally, the flex sensor 190 may include a piezoelectric-type flex sensor (not shown).

In a wind turbine system (FIGS. 6 and 7), the mast 20, first vane frame 50, first jib vane frame 115, second vane frame 100, and second jib vane frame 160 together form a turbine assembly 1111. The frame 40 in such embodiments takes the form of the round rotatable platform 200 fixed at the turbine assemblies 11 and further including two additional of the turbine assemblies 11 each mutually spaced 60-degrees from a center point 205 around the round rotatable platform 200. A center axle 210 of the round rotatable platform 200 may include a platform controller 220 configured to rotate the platform 200 to optimize power from the three generators 30 of the three turbine assemblies 11.

Such embodiments preferably include a platform generator 230 fixed with the center axle 210 of the rotatable platform 200 and configured to generate electricity when the rotatable platform 200 rotates. A gearbox 240 is disposed between the first end 22 of the mast 20 and the generator 30, and one of the gearboxes 240 is disposed between the center axle 210 and the platform generator 230.

Figure 8:
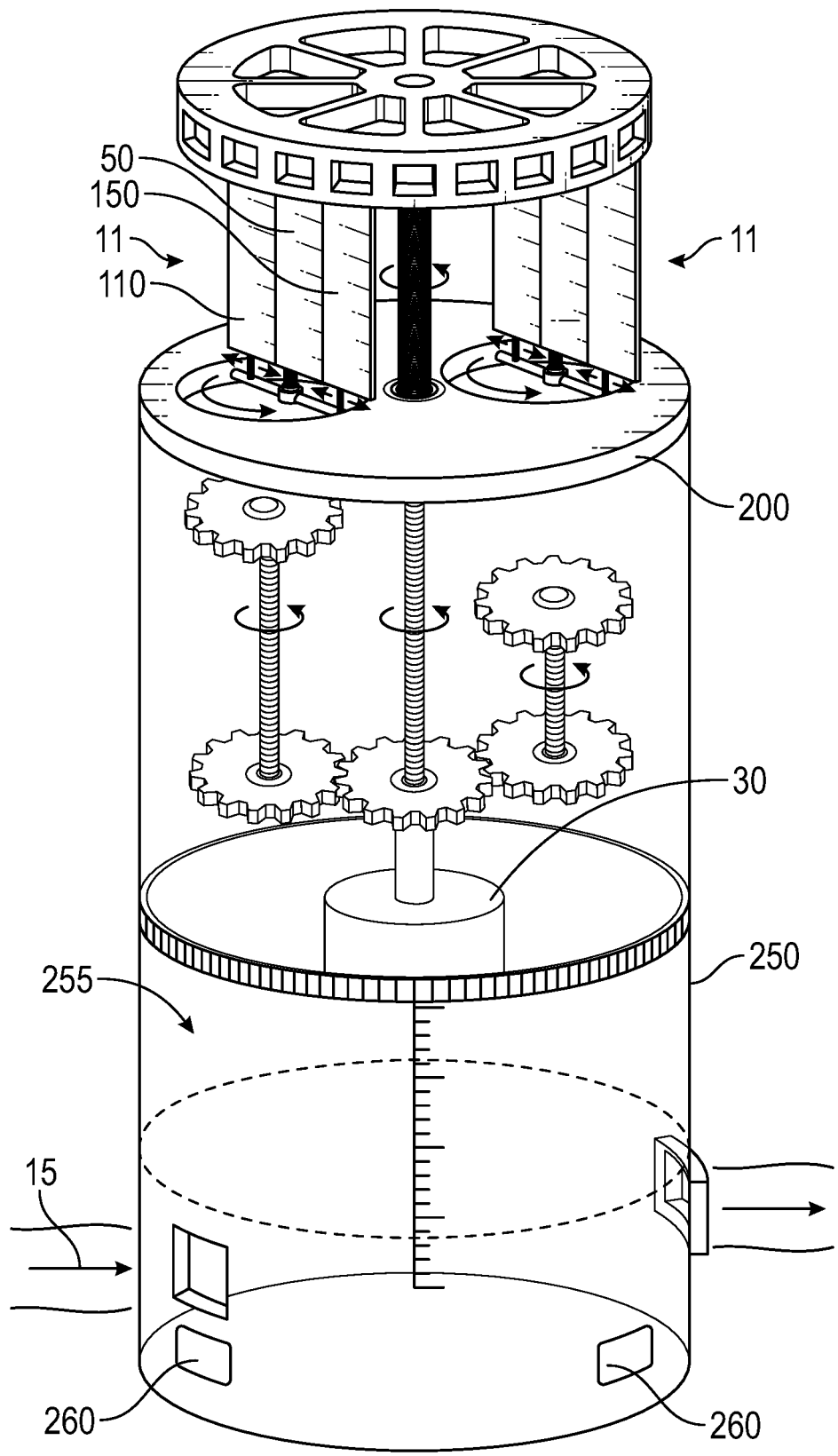
FIG. 8 is a perspective diagram of a buoy base for positioning the invention above a body of water.

In some embodiments, a buoy base 250 (FIG. 8) is further included and configured for holding the rotatable platform 200 and gearboxes 240 above a body of water 15, such as an ocean or lake. The buoy base 250 comprises a substantially hollow interior 255 in fluid communication with the body of water 15 through one or more pumps 260 electrically connected with the controller 170. As such, the buoy base 250 can position the rotatable platform 200 and the gearboxes 240 between a raised position and a lowered position based on wind conditions at various elevations above the body of water 15, as determined by the controller 170.

While a particular form of the invention has been illustrated and described, it will be apparent that various modifications can be made without departing from the spirit and scope of the invention. For example, the components listed herein may form part of a larger energy generating device that also includes solar energy collection, wave energy collection, or the like. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms.

Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A wind turbine, comprising:
   a mast having a longitudinal axis, a first end connected with a generator, and an opposing second end;
   a frame configured for rotatably holding the mast by the first end and the second end;
   a first vane frame including a top member, a bottom member, and two opposing side members, all defining a vane frame plane, a plurality of vanes fixed between each side member of the vane frame, each vane configured for rotating within the vane frame between a zero-degree closed position wherein each vane is substantially aligned with the vane frame plane, and a 90-degree open position wherein each vane is orthogonal to the vane frame plane, the vane frame fixed along one of the side members with the mast such that the top member of the vane frame is proximate the second end of the mast and such that the bottom member of the vane frame is proximate the first end of the mast, one or more actuator mechanisms configured for rotating the vanes between the open position and the closed position; and
   a second of the vane frames fixed opposite the mast such that when the vanes of the first vane frame are in the open position, each vane is oriented 180-degrees opposite of the open vanes of the second vane frame;
   whereby with a wind blowing against the wind turbine along a wind vector, the actuator mechanisms of each vane frame cooperate to rotate the vanes in the first vane frame to the closed position to cause the wind to rotate the mast in a first direction, and to rotate the vanes in the second vane frame to the open position to allow the wind to blow through the second vane frame with minimal resistance, whereupon when the vane frames become aligned with the wind vector the actuator mechanisms toggle the rotation of the vanes to open the vanes in the first vane frame and to close the vanes in the second vane frame, the vane positions toggling each time the vane frames rotates through the wind vector so that the wind will continuously drive rotation of the wind turbine.

2. The wind turbine of claim 1 further including a first jib slidably engaged behind the first vane frame, the first jib including another of the vane frames wherein the vanes of the first jib vane frame are oriented in common with the vanes of the first vane frame, a first jib actuator configured for moving the first jib between a retracted position directly behind the first vane frame and an extended position laterally away from the mast and the first vane frame; and
   a second jib slidably engaged in front of the second vane frame, the second jib including another of the vane frames wherein the vanes of the second jib vane frame are oriented in common with the vanes of the second vane frame, a second jib actuator configured for moving the second jib between the retracted position directly in front of the second vane frame and the extended position laterally away from the mast and the second vane frame.

3. The wind turbine of claim 2 wherein the one or more actuator mechanisms of the first vane frame are connected with the one or more actuator mechanisms of the first jib vane frame for common movement of the vanes of the first vane frame and the vanes of the first jib vane frame, and wherein the one or more actuator mechanisms of the second vane frame are connected with the one or more actuator mechanisms of the second jib vane frame for common movement of the vanes of the second vane frame and the vanes of the second jib vane frame.

4. The wind turbine of claim 2 wherein the first jib actuator is connected with the second jib actuator for common movement of the first jib and the second jib between the retracted positions and the extended positions thereof.

5. The wind turbine of claim 2 further including a controller configured for actuating the vane frame actuators and the jib actuators to maximize torque imparted to the mast by the wind.

6. The wind turbine of claim 5 wherein the controller further includes an anemometer for facilitating timing the actuation and direction of the actuators.

7. The wind turbine of claim 5 wherein one or more of the vanes in one or more of the vane frames includes a flex sensor configured to detect wind strength against the vane, the flex sensor in electrical communication with the controller.

8. The wind turbine of claim 5 wherein the mast, first vane frame, first jib vane frame, second vane frame, and second jib vane frame form a turbine assembly, the frame including a round rotatable platform fixed at the turbine assembly and further including two additional of the turbine assemblies spaced substantially 60-degrees from a center point around the round rotatable platform, a center axle of the round rotatable platform including a platform controller configured to rotate the platform to optimize power from the three generators of the three turbine assemblies.

9. The wind turbine of claim 8 further including a platform generator fixed with the center axle of the rotatable platform and configured to generate electricity when the rotatable platform rotates.

10. The wind turbine of claim 9 further including a gearbox disposed between the first end of each mast and its generator, and one of the gearboxes disposed between the center axle and the platform generator.

11. The wind turbine of claim 10 further including a buoy base configured for holding the rotatable platform and gearboxes above a body of water, the buoy base comprising a substantially hollow interior in fluid communication with the body of water through one or more pumps electrically connected with the controller, whereby the buoy base can position the rotatable platform and gearboxes between a raised position and a lowered position so as to position the rotatable platform based on wind conditions at various elevations.

12. The wind turbine of claim 1 further including a gearbox disposed between the first end of the mast and the generator.

13. The wind turbine of claim 1 wherein the mast further includes a second set 320 of the vane frames rotationally offset from a first set 310 of the vane frames by about 45-degrees, and a third set 330 of the vane frames rotationally offset from the second set of vane frames by about 45-degrees.

14. A wind turbine, comprising:
a mast having a longitudinal axis, a first end connected with a generator, and an opposing second end;
a frame configured for rotatably holding the mast by the first end and the second end;
a first vane frame including a top member, a bottom member, and two opposing side members, all defining a vane frame plane, a plurality of vanes fixed between each side member of the vane frame, each vane configured for rotating within the vane frame between a zero-degree closed position wherein each vane is substantially aligned with the vane frame plane, and a 90-degree open position wherein each vane is orthogonal to the vane frame plane, the vane frame fixed along one of the side members with the mast such that the top member of the vane frame is proximate the second end of the mast and such that the bottom member of the vane frame is proximate the first end of the mast, one or more actuator mechanisms configured for rotating the vanes between the open position and the closed position;
a second of the vane frames fixed opposite the mast such that when the vanes of the first vane frame are in the open position, each vane is oriented 180-degrees opposite of the open vanes of the second vane frame;
a first jib slidably engaged behind the first vane frame, the first jib including another of the vane frames wherein the vanes of the first jib vane frame are oriented in common with the vanes of the first vane frame, a first jib actuator configured for moving the first jib between a retracted position directly behind the first vane frame and an extended position laterally away from the mast and the first vane frame; and
a second jib slidably engaged in front of the second vane frame, the second jib including another of the vane frames wherein the vanes of the second jib vane frame are oriented in common with the vanes of the second vane frame, a second jib actuator configured for moving the second jib between the retracted position directly in front of the second vane frame and the extended position laterally away from the mast and the second vane frame; and
a controller configured for actuating the vane frame actuators and the jib actuators to maximize torque imparted to the mast by the wind, one or more of the vanes in one or more of the vane frames including a flex sensor configured to detect wind strength against the vane, the flex sensor in electrical communication with the controller;
wherein the mast, first vane frame, first jib vane frame, second vane frame, and second jib vane frame form a turbine assembly, the frame including a round rotatable platform fixed at the turbine assembly and further including two additional of the turbine assemblies spaced substantially 60-degrees from a center point around the round rotatable platform, a center axle of the round rotatable platform including a platform controller configured to rotate the platform to optimize power from the three generators of the three turbine assemblies;
a platform generator fixed with the center axle of the rotatable platform and configured to generate electricity when the rotatable platform rotates; and
a gearbox disposed between the first end of each mast and its generator, and one of the gearboxes disposed between the center axle and the platform generator;
wherein the one or more actuator mechanisms of the first vane frame are connected with the one or more actuator mechanisms of the first jib vane frame for common movement of the vanes of the first vane frame and the vanes of the first jib vane frame, and wherein the one or more actuator mechanisms of the second vane frame are connected with the one or more actuator mechanisms of the second jib vane frame for common movement of the vanes of the second vane frame and the vanes of the second jib vane frame; and
wherein the first jib actuator is connected with the second jib actuator for common movement of the first jib and the second jib between the retracted positions and the extended positions thereof;
whereby with a wind blowing against the wind turbine along a wind vector, the actuator mechanisms of each vane frame cooperate to rotate the vanes in the first vane frame to the closed position to cause the wind to rotate the mast in a first direction, and to rotate the vanes in the second vane frame to the open position to allow the wind to blow through the second vane frame with minimal resistance, whereupon when the vane frames become aligned with the wind vector the actuator mechanisms toggle the rotation of the vanes to open the vanes in the first vane frame and to close the vanes in the second vane frame, the vane positions toggling each time the vane frames rotates through the wind vector so that the wind will continuously drive rotation of the wind turbine.

15. The wind turbine of claim 14 further including a buoy base configured for holding the rotatable platform and gearboxes above a body of water, the buoy base comprising a substantially hollow interior in fluid communication with the body of water through one or more pumps electrically connected with the controller, whereby the buoy base can raise the rotatable platform and gearboxes between a raised position and a lowered position so as to position the rotatable platform based on wind conditions.

* * * * *